United States Patent [19]

Kita et al.

[11] Patent Number: 5,079,490
[45] Date of Patent: Jan. 7, 1992

[54] SPINDLE DRIVE SYSTEM OF MACHINE TOOL

[75] Inventors: Hirofumi Kita; Takahiro Hayashida, both of Aichi, Japan

[73] Assignee: Mitsubishi Denki Kabushiki Kaisha, Tokyo, Japan

[21] Appl. No.: 581,954

[22] Filed: Sep. 13, 1990

[30] Foreign Application Priority Data

Oct. 3, 1989 [JP] Japan .................. 1-258192

[51] Int. Cl.$^5$ ............................................. G05B 19/18
[52] U.S. Cl. ............................... 318/569; 318/625; 318/600; 318/565; 318/577; 364/474.22; 364/474.26
[58] Field of Search ............... 318/569, 625, 600, 577, 318/565; 364/474.22, 474.26

[56] References Cited

U.S. PATENT DOCUMENTS 4,788,481 11/1988 Niwa ................................. 318/600
4,970,449 11/1990 Kawamura ........................ 318/569

FOREIGN PATENT DOCUMENTS 62-154109 7/1987 Japan .
62-245311 10/1987 Japan .

Primary Examiner—William M. Shoop, Jr.
Assistant Examiner—Saul M. Bergmann
Attorney, Agent, or Firm—Rothwell, Figg, Ernst & Kurz

[57] ABSTRACT

A spindle drive system of a machine tool, wherein a control mode changeover section of a control unit selects one of both a speed control mode for controlling a rotational speed of a spindle through negative feedback of the rotational speed of the spindle and a position control mode for controlling a rotational position of the spindle through negative feedback of the rotational position of the spindle, and a gain changeover section changes speed loop and position loop gains to a greater value during cutting operation than during non-cutting rapid feed operation when the position control mode has been selected.

3 Claims, 4 Drawing Sheets

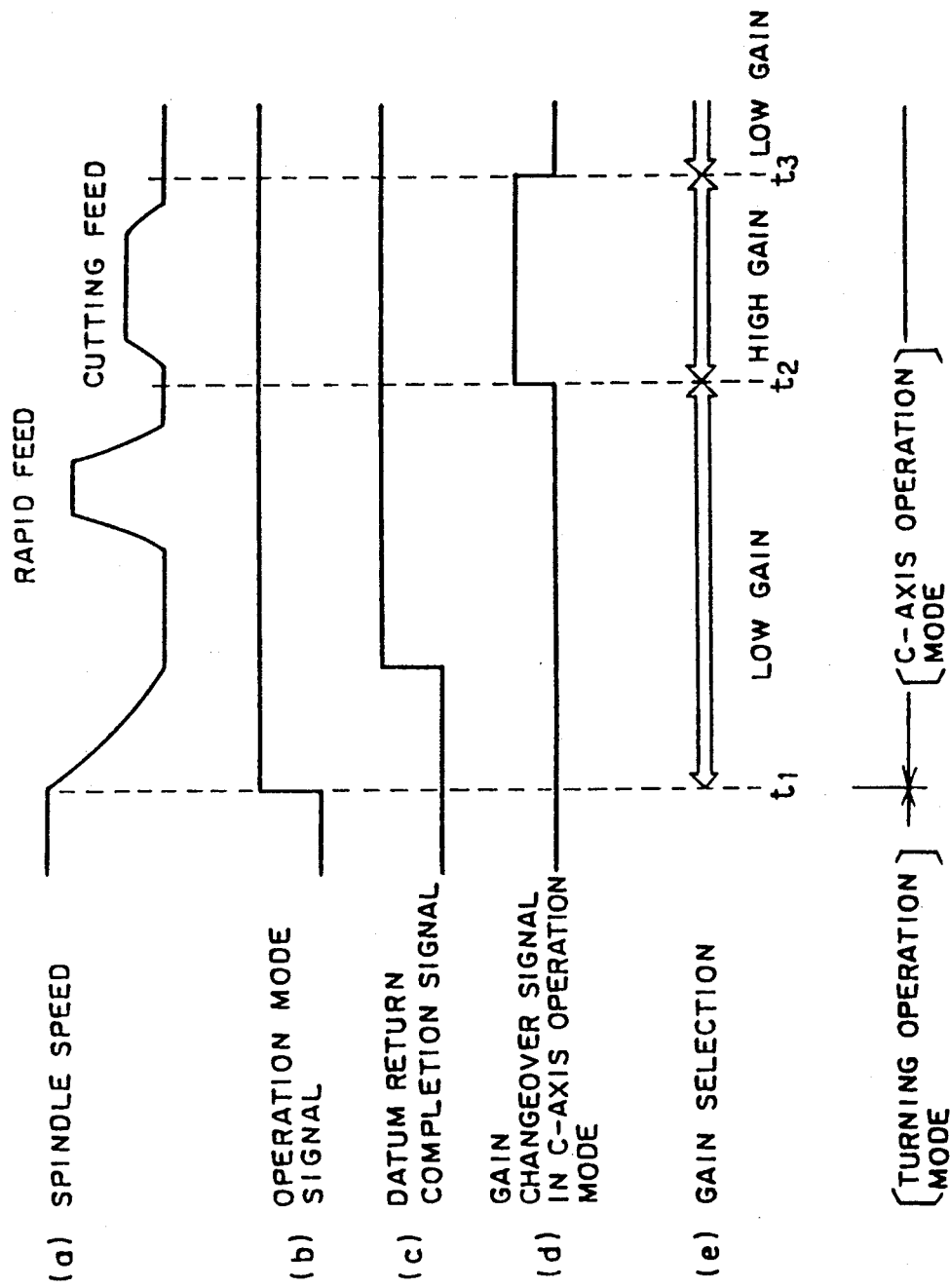

SPINDLE DRIVE SYSTEM OF MACHINE TOOL

BACKGROUND OF THE INVENTION

1. Field of the Invention

The present invention relates to improvements in a spindle drive system of a machine tool.

2. Description of the Prior Art

FIG. 1 is a block diagram of a spindle drive system disclosed in the Japanese Patent Application No. 63-05164 SPINDLE DRIVE SYSTEM OF MACHINE TOOL, a prior filed application of the same applicant. In this drawing, numeral 1 denotes a numerical-control system (hereinafter referred to as the N/C system); numeral 2 is a spindle drive control unit (hereinafter referred to as the control unit); numeral 3 represents an induction motor (hereinafter referred to as the motor); numeral 4 expresses a speed sensor connected to the motor 3; numeral 5 denotes a spindle; numeral 6 denotes a transmission gearing which transmits the driving force of the motor 3 to the spindle 5; and numeral 7 denotes a position sensor which is a high-resolution sensor capable of detecting a rotational position of the spindle 5 to a positioning accuracy of 1/1000° for example. The spindle drive system of the machine tool is constituted of the control unit 2, motor 3, speed sensor 4, and position sensor 7.

FIG. 2 is a block diagram showing the constitution of the control unit 2 comprising the major section of a conventional spindle drive system.

In FIG. 2, numeral 21 denotes a comparator which inputs a positional command $\theta\gamma^*$ from the N/C system 1 and a position detection signal $\theta\gamma$, and outputs a position deviation signal $\Delta\theta\gamma$ which is a difference between these signals. Numeral 22 is a position loop gain circuit which amplifies the positional deviation signal. Numeral 23 is a mode changeover switch as a control mode changeover means which makes the change and selection of a speed control mode for controlling the rotational speed of the spindle 5, that is, a turning operation mode for turning a rotating workpiece (not illustrated) to be machined, and a position control mode for controlling the rotational position of the spindle 5, that is, a C-axis operation mode. This switch is turned, in the speed control mode, to the "a" side for taking in a speed command $\omega\gamma^*$ from the N/C system 1, and, in the position control mode, to the "b" side for forming a position control loop. Numeral 24 is a comparator which inputs an output signal of the mode changeover switch 23 and the speed detection signal $\omega\gamma$ from the speed sensor 4 and outputs a speed deviation signal $\Delta\omega\gamma$ which is a difference between these signals inputted. Numeral 25 denotes a speed loop gain circuit which amplifies a speed deviation signal $\Delta\omega\gamma$, and numeral 26 denotes an electric power conversion circuit which converts the output signal of the speed loop gain circuit 25 into power to be supplied to the motor 3.

In FIGS. 1 and 2, the speed command $\omega\gamma^*$ outputted from the N/C system 1 is fed as a three-phase AC current command through the control unit 2 to the motor 3, which rotates in accordance with the speed command $\omega\gamma^*$. The rotation of the motor 3 is transmitted to the spindle 5 through the transmission gearing 6, the spindle 5 being driven. The gear ratio of the transmission gearing 6 is determined according to a purpose of operation. The position sensor 7 having a high resolution capable of detecting 1/1000° is mounted on the spindle 5, thus detecting the position of the spindle 5 with a high accuracy and feeding back a detection result to the control unit 2.

The control unit 2, as described above, is so constituted as to control the speed of the spindle 5 in the turning operation mode and the position of the spindle 5 in the C-axis operation mode.

Next, the operation of the spindle drive system will be explained.

First, when operation is performed in the turning operation mode, that is, when ordinary turning operation using the spindle is carried out, the speed command $\omega\gamma^*$ corresponding to a target speed of the spindle 5 is outputted from the N/C system 1, and the control unit 2 operates to make the speed $\omega\gamma$ of the motor 3 follow the speed command $\omega\gamma^*$. Namely, in the turning operation mode, the mode changeover switch 23 is set to the "a" side to take in the speed command $\omega\gamma^*$ so that the speed loop control of the spindle 5 may be done by the control unit 2 shown in FIG. 2, and the comparator 24 receives the speed command $\omega\gamma^*$ and the speed detection signal $\omega\gamma$ from the speed sensor 4, then outputting the speed deviation signal $\Delta\omega\gamma$ which is a difference between them. This speed deviation signal $\Delta\omega\gamma$ is amplified by the speed loop gain circuit 25, and converted into the power for driving the motor 3 by the power conversion circuit 26. The motor 3 is controlled to follow the speed command $\omega\gamma^*$ from the N/C system 1.

Next, when the machine tool is to be operated in the C-axis operation mode, a command from the N/C system 1 is changed from the speed command $\omega\gamma^*$ to the position command $\theta\gamma^*$ of the C-axis operation mode. The control unit 2 drives the motor 3 in accordance with this position command $\theta\gamma^*$, thus controlling the position of the spindle 5. That is, in FIG. 2, the mode changeover switch 23 is set to the "b" side to form the position loop, while the comparator 21 receives the position command $\theta\gamma^*$ from the N/C system 1 and the position detection signal $\theta\gamma$ from the position sensor 7, and outputs the position deviation signal $\Delta\theta\gamma$. This position deviation signal $\Delta\theta\gamma$ is amplified by the position loop gain circuit 22, being inputted into the comparator 24 via the mode changeover switch 23. The comparator 24 and subsequent circuits operate in the similar manner as in the turning operation mode, being controlled so as to operate the spindle 5 in accordance with the position command $\theta\gamma^*$ from the N/C system 1 through the motor 3.

In the above-described example, when the C-axis position control is performed by the use of the motor 3 with the turning operation mode changed to the C-axis operation mode, it is necessary to fully raise the positional loop gain and the speed loop gain in order to obtain responsivity enabling C-axis cutting. However, there has been such a problem that the mechanical system of the machine tool makes resonance depending on operating conditions during a rapid feed in the turning operation mode or in the C-axis operation mode, easily causing vibration and noise.

SUMMARY OF THE INVENTION

The present invention has been accomplished in an attempt to solve the problems mentioned above, and has as its object the provision of a high-performance, easy-to-operate spindle drive system of a machine tool which can drive the spindle without adversely affecting the C-axis cutting performance of the machine.

To achieve the aforesaid object, the spindle drive system of a machine tool according to the present invention is equipped with a motor which drives the spindle of the machine tool and a control unit for controlling the rotational speed and position of the spindle through the motor, the control unit comprising a speed loop for the negative feedback of the spindle speed and a positional loop for the negative feedback of the rotational position, a control mode changeover means for the selection of either of the speed control mode for controlling the spindle speed and a position control mode for controlling the rotational position of the spindle, and a gain change means for changing a speed loop and positional loop gain in accordance with the operation mode when the position mode has been selected.

The foregoing objects and other objects and new features of the present invention will become more apparent and understandable from the following detailed description thereof, when read in connection with the accompanying drawings.

BRIEF DESCRIPTION OF THE DRAWINGS

FIG. 4 is an explanatory view of operation when the speed control mode of the spindle drive control unit shown in FIG. 3 has been switched over to the position control mode.

DETAILED DESCRIPTION OF THE PREFERRED EMBODIMENTS

Figure 1:
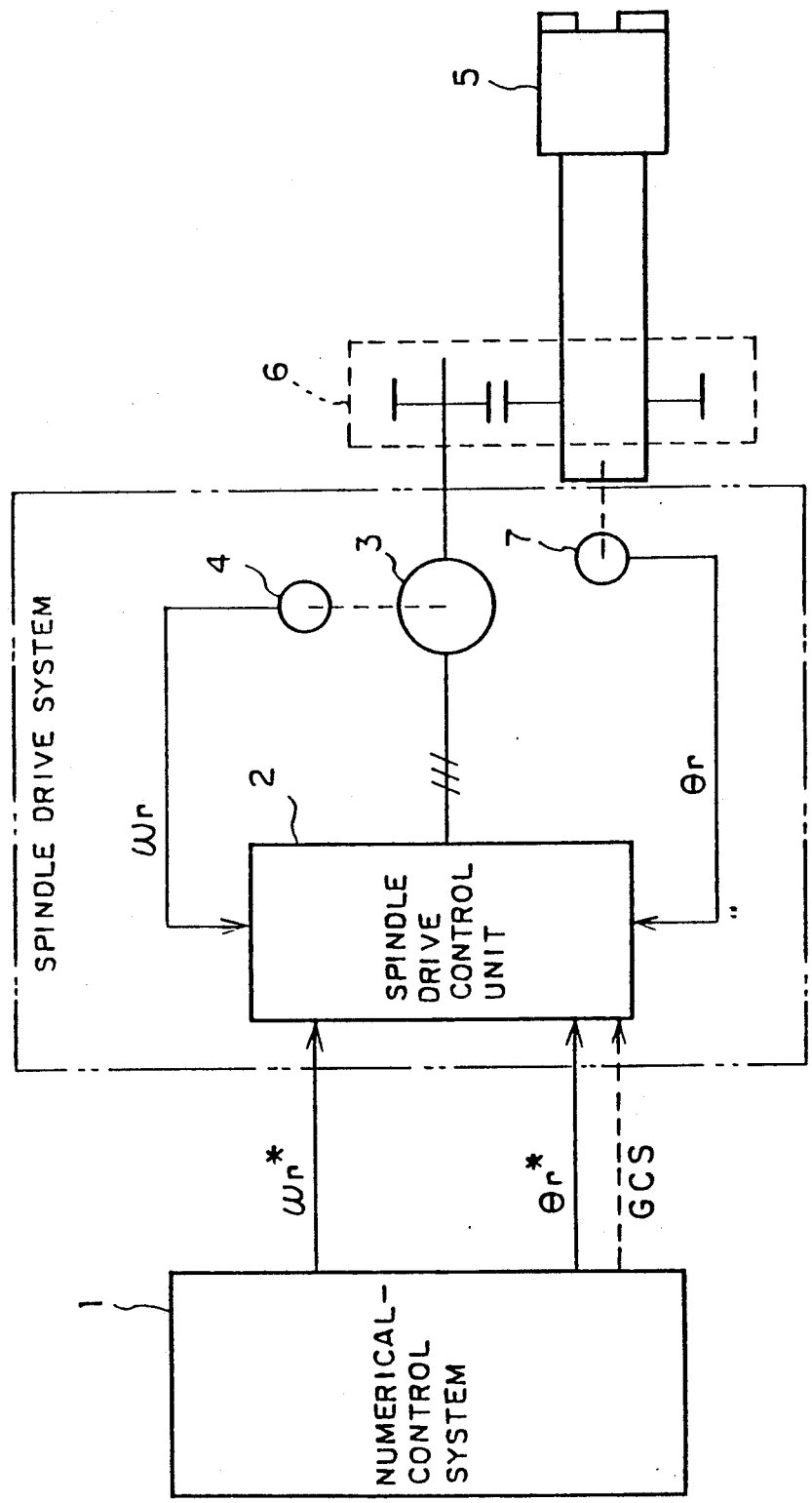
FIG. 1 is a schematic block diagram of a spindle drive system of a machine tool common to a prior art and the examples of the present invention.
Figure 2:
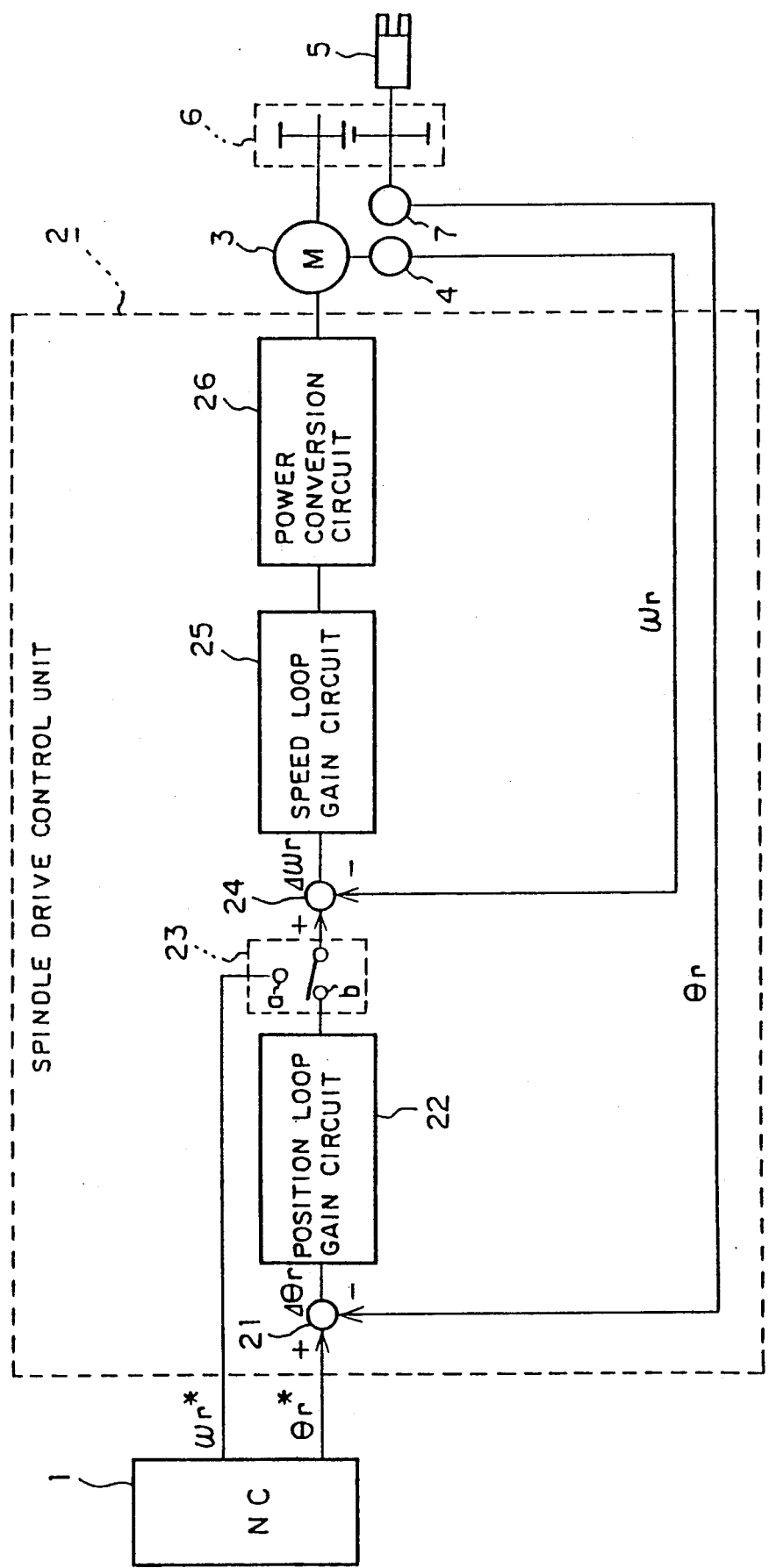
FIG. 2 is a block diagram showing the constitution of a prior-art spindle drive system.

Hereinafter the spindle drive system of a machine tool according to one embodiment of this invention will be described by referring to FIGS. 3 and 4. The general constitution of this embodiment is identical to the prior-art example except for the addition, to the prior-art example shown in FIG. 1, of a signal line for a gain changeover signal GCS to be inputted from the N/C system 1 to the control unit 1 shown by an alternate long and short dash line and therefore will not be described here.

Figure 3:
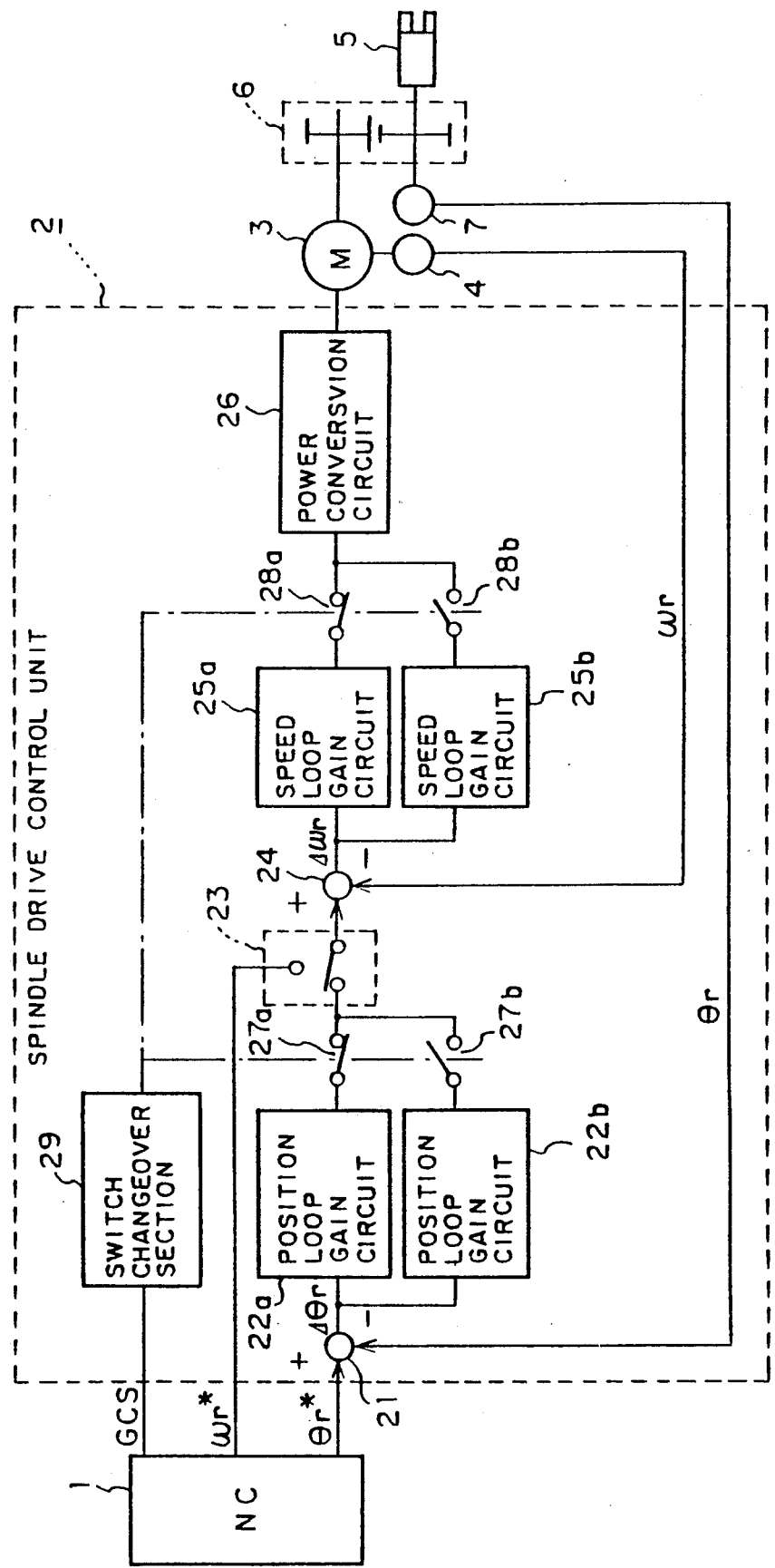
FIG. 3 is a block diagram showing the constitution of the spindle drive control unit in the spindle drive system of a machine tool according to one embodiment of the invention.

FIG. 3 is a block diagram showing the constitution of the control unit 2 according to one embodiment of this invention. In this drawing, the same reference numerals as those used in the prior-art example indicate the same or corresponding parts appearing in the prior-art example.

In this drawing, numerals 22a and 22b each denote a positional loop gain circuit which inputs the position deviation signal $\Delta\theta\gamma$ outputted from the comparator 21, amplifies and outputs the signal in accordance with its gain value. The gain of the position loop gain circuit 22b has been set higher than the gain of the other gain circuit 22a. Numerals 25a and 25b each denote a speed loop gain circuit which inputs a speed deviation signal $\Delta\omega\gamma$ outputted from the comparator 24, and amplifies and outputs in accordance with its gain value. The gain of the speed loop gain circuit 25b has been set higher than the gain of the other gain circuit 25a. Numerals 27a and 27b each denote a switch provided on the output side of the position loop gain circuits 22a and 22b respectively; numerals 28a and 28b each denote a switch provided on the output side of the speed loop gain circuits 25a and 25b respectively, and numeral 29 denotes a switch changeover section which controls the on-off operation to close either one of the switches 27a and 27b and also either one of the switches 28a and 28b and to open the other. The above-mentioned switches 27a, 27b, 28a and 28b and the switch changeover section 29 constitute a gain changing means which changes the loop gain such that the position loop gain circuit 22a and the speed loop gain circuit 25a are selected when no gain changeover signal GCS is inputted from the N/C system 1 and also the position loop gain circuit 22b and the speed loop gain circuit 25b are selected when the gain changeover signal GCS is inputted.

FIG. 4 shows the operation of the spindle drive system according to this embodiment when the turning operation mode as the speed control mode has been changed over to the C-axis operation mode as the position control mode.

Next, operation will be explained. First, the turning operation mode is nearly the same as that of the prior-art spindle drive system. Namely, in FIG. 3, the mode changeover switch 23 as a control mode changeover means is switched over to the contact "a" by a command from the N/C system 1; the speed command $\omega\gamma^*$ from the N/C system 1 is inputted to the comparator circuit 24 via the control mode changeover switch 23; and the comparator circuit 24 outputs the speed deviation signal $\Delta\omega\gamma$ which is a difference between the speed command $\omega\gamma^*$ and the speed detection signal $\omega\gamma$ inputted from the speed sensor 4 connected to the motor 3. In the turning operation mode, with the switch 28a closed and the switch 28b opened, the speed loop gain circuit 25a is in an effective condition, the speed deviation signal $\Delta\omega\gamma$ being amplified in accordance with the gain of the speed loop gain circuit 25a and being converted by the power conversion circuit 26 into the electric power to drive and control the motor 3. The rotational speed of the motor 3 is controlled in accordance with the speed command $\omega\gamma^*$ from the N/C system 1.

In the C-axis operation mode, detecting that a command from the N/C system 1 is changed from the speed command $\omega\gamma^*$ over to the position command $\theta\gamma^*$, the control unit 2 sets the mode changeover switch 23 to the contact "b", thus forming the position control loop.

In the C-axis operation mode, when no gain changeover signal GCS is inputted from the N/C system 1, the switch changeover section 29 closes the switches 27a and 28a and opens the switches 27b and 28b, thereby making effective the position loop gain circuit 22a and the speed loop gain circuit 25a. The position gain of the position loop gain circuit 22a and the speed gain of the speed loop gain circuit 25a are properly set to the degree that the spindle drive system will not make resonant vibration with the mechanical system during a stop as well as during a rapid feed in a non-cutting stroke and that no position control overshoot and undershoot will take place. When the position command $\theta\gamma^*$ from the N/C system 1 is inputted to the comparator 21, the comparator 21, comparing the position command $\theta\gamma^*$ with the position detection signal $\theta\gamma$ from the position detector 7 directly coupled with the spindle 5, outputs the position deviation signal $\Delta\theta\gamma$. This signal $\Delta\theta\gamma$ is amplified in accordance with the position loop gain of the position loop gain circuit 22a, then being inputted into the comparator 24 via the switch 27a and the mode changeover switch 23. Hereafter, operation is carried out in the similar manner as the operation in the turning operation mode, and the spindle 5 is driven by the motor 3 in accordance with the position command $\theta\gamma^*$ from the N/C system 1, the rotational position thereof being controlled.

In the C-axis operation mode, when the gain changeover signal GCS from the N/C system 1 has been inputted, the switch changeover section 29 keeps the switches 27a and 28a in the OPEN position and the switches 27b and 28b in the CLOSED position as long as this signal GCS is inputted, selecting both the position loop gain circuit 22b and the speed loop gain circuit 25b. The position gain of the position loop gain circuit 22b and the speed gain of the speed loop gain circuit 25b are set to a greater gain value than the gains of the gain circuits 22a and 25a to a degree they can withstand the C-axis cutting operation. Similarly to the case no gain changeover signal GCS is inputted from the N/C system 1, the spindle 5 is driven by the motor 3 in accordance with the positional command $\theta\gamma^*$ from the N/C system 1, the rotational position thereof being controlled.

Next, the operation of the spindle drive system will be explained with reference to FIG. 4, in which the spindle 5 proceeds to a cutting feed after a rapid feed when a switchover has been done from the turning operation mode to the C-axis operation mode.

As shown in FIG. 4 (b), upon the input of a signal for selecting the C-axis operation mode from the N/C system 1 to the control unit 2 at the time $t_1$, the control unit 2 changes the turning operation mode, i.e., the speed control mode, to the C-axis operation mode, i.e., the position control mode, and as shown in FIG. 4 (e) the position loop gain and the speed loop gain are set to relatively low (the speed loop gain is also set to relatively low in the speed control mode). That is, the switch 27a and the switch 28a are both closed, and accordingly the position loop gain circuit 22a and the speed loop gain circuit 25a are effective. And as shown in FIG. 4 (a), the spindle 5 is positioned at the machine datum while decreasing its speed from the high-speed rotation.

Further, when the rotational position of the spindle 5 has completed its return to the machine datum, a datum return completion signal is outputted as shown in FIG. 4 (c). After the spindle 5 is driven to a prescribed position at a prescribed distance from the machine datum by a non-cutting rapid feed as shown in FIG. 4 (a), the gain changeover signal GCS is outputted, at the time $t_2$, from the N/C system 1 to the control unit 2 in the C-axis operation mode as shown in FIG. 4 (d). When this gain changeover signal GCS is inputted, the position gain and the speed gain are switched from a low gain to a high gain, as shown in FIG. 4 (e). That is, the switch changeover control section 29 shown in FIG. 3 operates to keep the switch 27b closed, the switch 27a open, the switch 28b closed, and the switch 28a opened between times $t_2$ and $t_3$, thereby making the position loop gain circuit 22b and the speed loop gain circuit 25b effective. Thus the spindle 5 starts a cutting feed as shown in FIG. 4 (a). During the C-axis non-cutting period in the C-axis operation mode, the rotational speed of the spindle 5 changes from a stationary state to a non-cutting high-speed feed state, resulting in a large speed change. If, in this case, the position gain and the speed gain are excessively great, there will occur such a trouble as mechanical system resonance. However, since the spindle 5 is in the non-cutting state and the motor 3 is a little loaded, the position gain and the speed gain are allowed to be low. And therefore the position and speed gains may be set low so that no mechanical system resonance will occur and that, if there takes place the resonance, it can be held fully low. During the C-axis cutting operation in the C-axis operation mode, high position and speed gains are required so that the spindle 5 can make a quick response. In the C-axis operation mode, the rotational speed is low with a small change in speed, and therefore the mechanical system will hardly resonate in practical use if a high gain is selected, and the resonance, if having occurred, can be held at a fully low level. In this case, therefore, the position and the speed gains should be set high.

In this embodiment, for the convenience of explanation, the control unit 2 comprising such hardware as the comparators 21 and 24, the mode changeover switch 23, and the switches 27a, 27b, 28a and 28b. However, except for the power element (not illustrated) comprising the electric power conversion circuit 26 and a part of its control circuit (not illustrated), a computer system including software and such hardware as a central processing unit, memory, etc. may be employed. The same effect is obtainable by using a means equivalent to the aforesaid comparator 21 to the switch changeover section 29 on a program to be executed by the computer system.

Furthermore in this embodiment described above, an example has been given that either of the position and speed loop gains have two positions, a high gain and a low gain, but it should be understood that the number of the gain positions should not be limited to the two but may be multiple in order to insure higher precise movement of the spindle for non-cutting rapid feed and cutting feed in the C-axis operation mode.

According to the present invention, the speed loop and the position loop gains in the C-axis cutting operation are changeable to a greater value in the rotational position control of the spindle. It is, therefore, possible to obtain a high machining performance without resonance of the mechanical system.

What is claimed is:

1. A spindle drive system of a machine tool comprising a motor which drives a spindle of said machine tool; and a control unit for controlling a rotational speed and a rotational position of said spindle through said motor, said control unit having a speed loop means for a negative feedback control of the rotational speed of said spindle, a position loop means for a negative feedback control of the rotational position of said spindle, a control mode changeover means for selecting one of both a speed control mode for controlling the rotational speed of said spindle and a position control mode for controlling the rotational position of said spindle, and a gain changeover means for changing the loop gain of each of said speed and position loops in accordance with both operation modes of said machine tool when said position control mode is selected, said gain changeover means including means for setting each of said loop gains of said speed and position loops in a first gain level setting in the non-cutting mode of said position control mode and in a second gain level setting different from said first gain level setting for the cutting feed mode of said position control mode.

2. A spindle drive system of a machine tool as claimed in claim 1, wherein, in a cutting feed mode for cutting of a workpiece, said gain changeover means changes each loop gain of said speed and position loop means to a predetermined value different from that in both said rotational speed control mode and the non-cutting mode of said position control mode.

3. A spindle drive system of a machine tool as claimed in claim 1 or 2, wherein, in the non-cutting feed mode of said position control mode for rapid feed of a workpiece, said gain changeover means changes each loop gain of said speed and position loop means to a predetermined value different from that both said rotational speed control mode and said cutting feed mode of said position control mode.

* * * * *